(12) United States Patent
Hanya et al.

(10) Patent No.: US 8,947,833 B2
(45) Date of Patent: Feb. 3, 2015

(54) DISK DRIVE SUSPENSION WITH INTERFACE INTERSECTION CORNER FORMED BETWEEN INSULATING RESIN LAYER AND ADHESIVE BLOCK

(71) Applicant: NHK Spring Co., Ltd., Yokohama-shi, Kanagawa (JP)

(72) Inventors: Masao Hanya, Aiko-gun (JP); Kenichi Takikawa, Aiko-gun (JP); Toshiki Ando, Aiko-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 14/036,548

(22) Filed: Sep. 25, 2013

(65) Prior Publication Data
US 2014/0085755 A1    Mar. 27, 2014

(30) Foreign Application Priority Data
Sep. 27, 2012 (JP) ................................. 2012-214023

(51) Int. Cl.
| G11B 21/10 | (2006.01) |
| G11B 21/21 | (2006.01) |
| G11B 5/48 | (2006.01) |
| G11B 5/596 | (2006.01) |
| G11B 5/60 | (2006.01) |

(52) U.S. Cl.
CPC .............. G11B 5/4826 (2013.01); G11B 5/482 (2013.01); G11B 5/4853 (2013.01)
USPC ....................................................... 360/294.4

(58) Field of Classification Search
CPC ............................ G11B 5/4873; G11B 5/4826
USPC ........................................................ 360/294.4
See application file for complete search history.

(56) References Cited

U.S. PATENT DOCUMENTS

| 6,967,821 | B2 | 11/2005 | Himes et al. |
| 7,495,178 | B2 | 2/2009 | Ishii et al. |
| 8,218,267 | B2 | 7/2012 | Arai et al. |
| 8,675,314 | B1 | 3/2014 | Bjorstrom et al. |
| 2001/0012182 | A1 | 8/2001 | Boutaghou et al. |
| 2003/0202292 | A1 | 10/2003 | Arya et al. |

(Continued)

FOREIGN PATENT DOCUMENTS

| JP | 2007-234982 A | 9/2007 |
| JP | 2008-287835 A | 11/2008 |

(Continued)

OTHER PUBLICATIONS

Related U.S. Appl. No. 14/036,502; First Named Inventor: Masao Hanya; Title: "Disk Drive Suspension"; filed Sep. 25, 2013.

*Primary Examiner* — Craig A. Renner
(74) *Attorney, Agent, or Firm* — Holtz, Holtz, Goodman & Chick PC

(57) ABSTRACT

A slider and a microactuator element are disposed on a gimbal portion of a flexure. The gimbal portion comprises a metal base, an electrically insulating resin layer, a conductor disposed on the resin layer, an electrically insulating adhesive block, and an electrically conductive paste. The adhesive block secures an end portion of the microactuator element to the metal base. The conductive paste is provided between the conductor and an electrode of the microactuator element. A first adhesive interface extending along the thickness of the resin layer, a second adhesive interface extending along a surface of the resin layer, and a corner portion are formed between the metal base and the conductive paste.

12 Claims, 13 Drawing Sheets

(56) References Cited

U.S. PATENT DOCUMENTS

| | | |
|---|---|---|
| 2009/0190260 A1 | 7/2009 | Kobatake |
| 2010/0238581 A1 | 9/2010 | Nakamura et al. |
| 2011/0096438 A1 | 4/2011 | Takada et al. |
| 2012/0231156 A1 | 9/2012 | Arai et al. |
| 2014/0085754 A1 | 3/2014 | Hanya et al. |

FOREIGN PATENT DOCUMENTS

| | | |
|---|---|---|
| JP | 2010146631 A | 7/2010 |
| JP | 2010218626 A | 9/2010 |

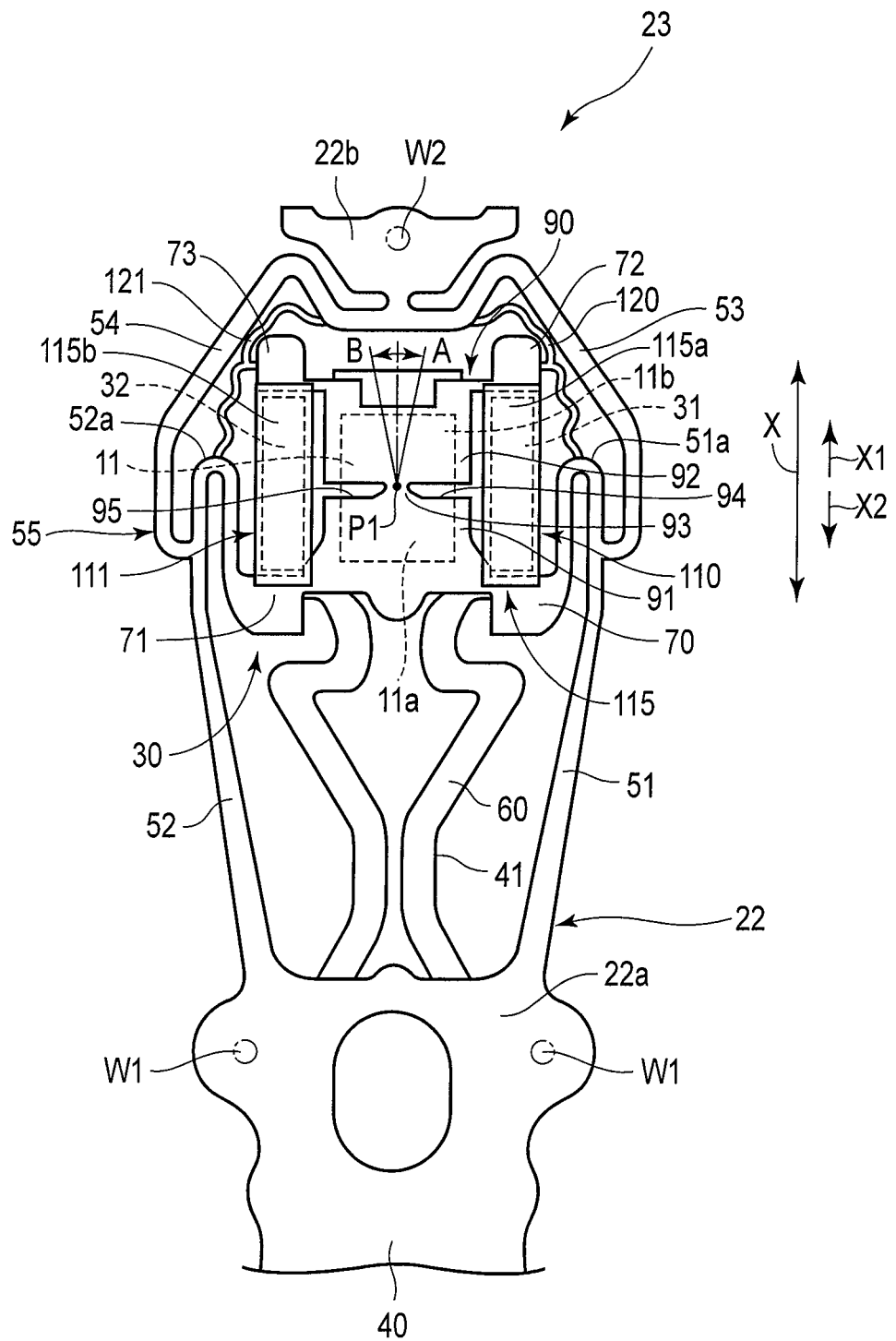
F I G. 6

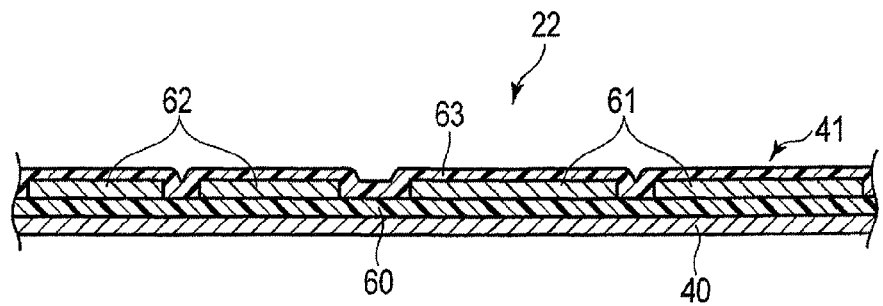
F I G. 8
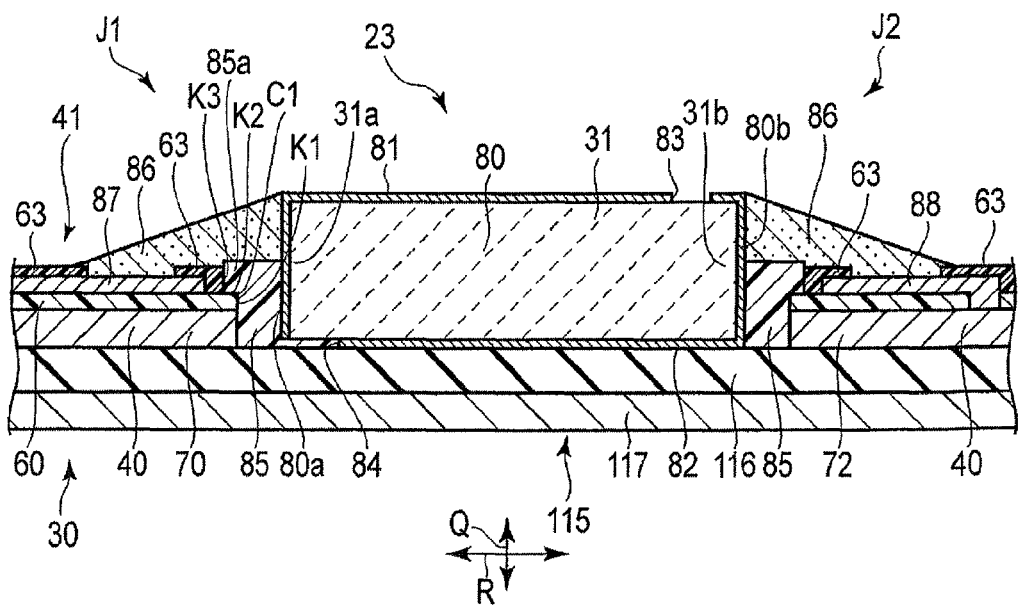
F I G. 9
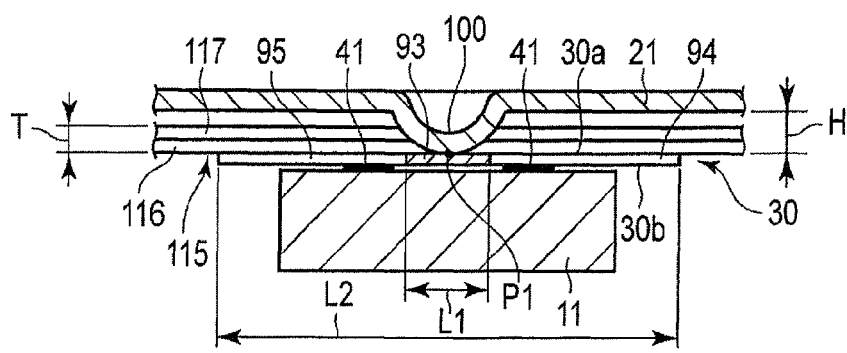
F I G. 10

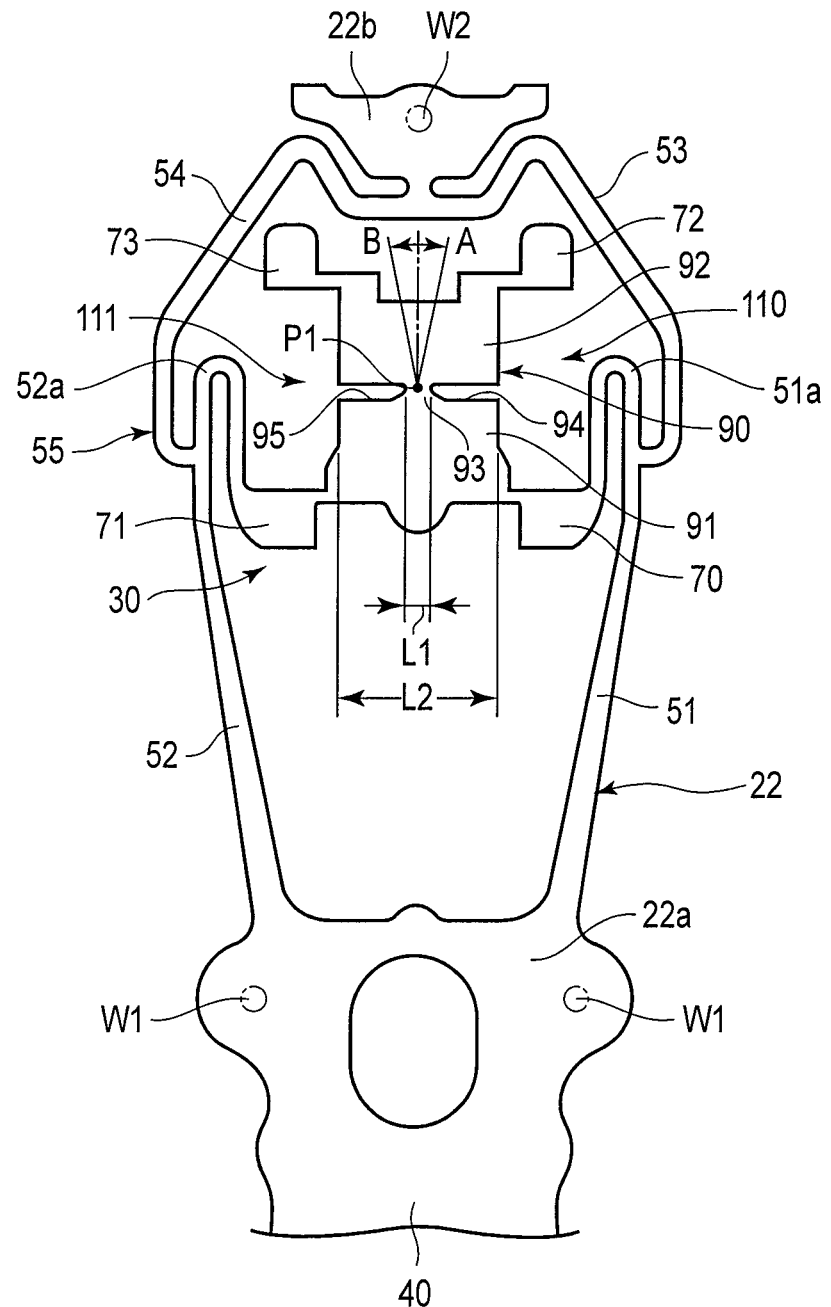
F I G. 11

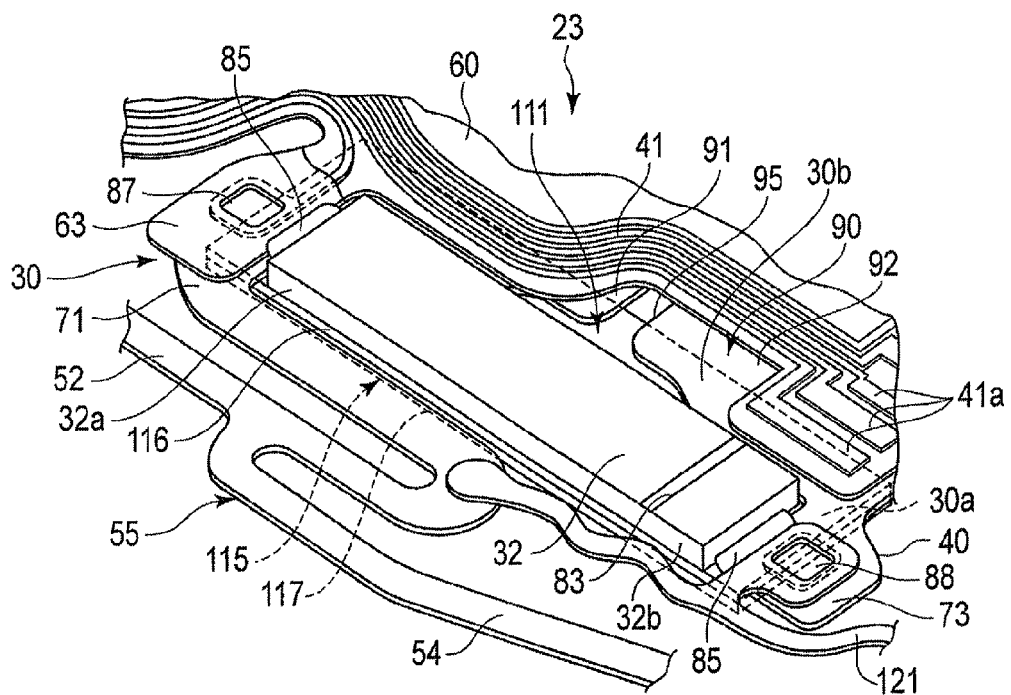
F I G. 14
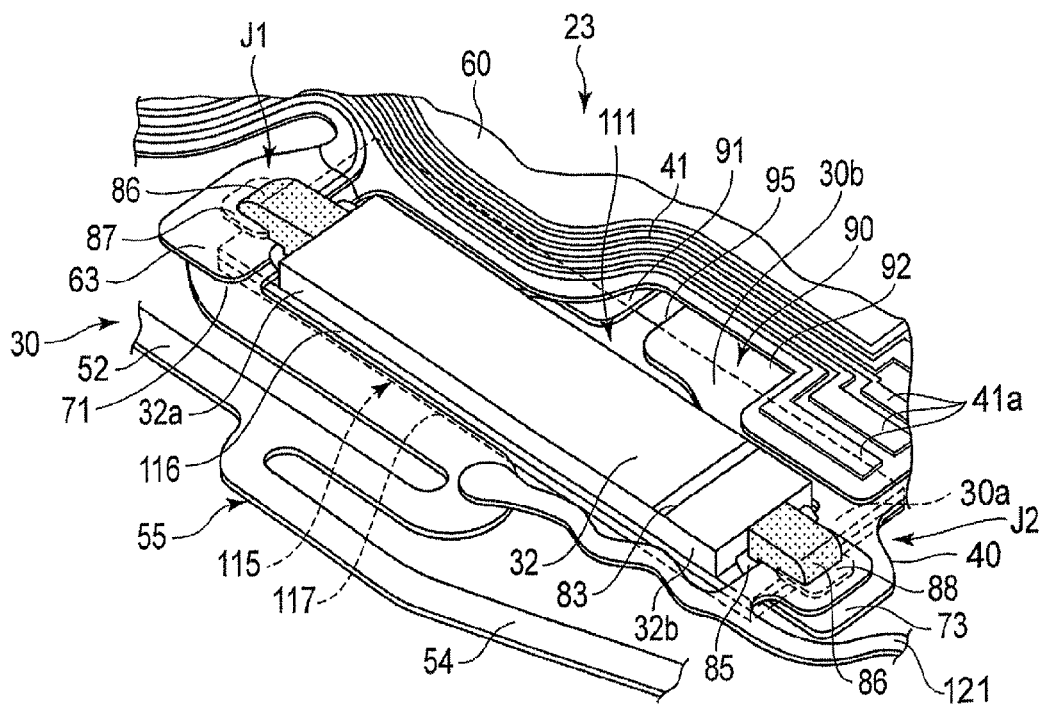
F I G. 15

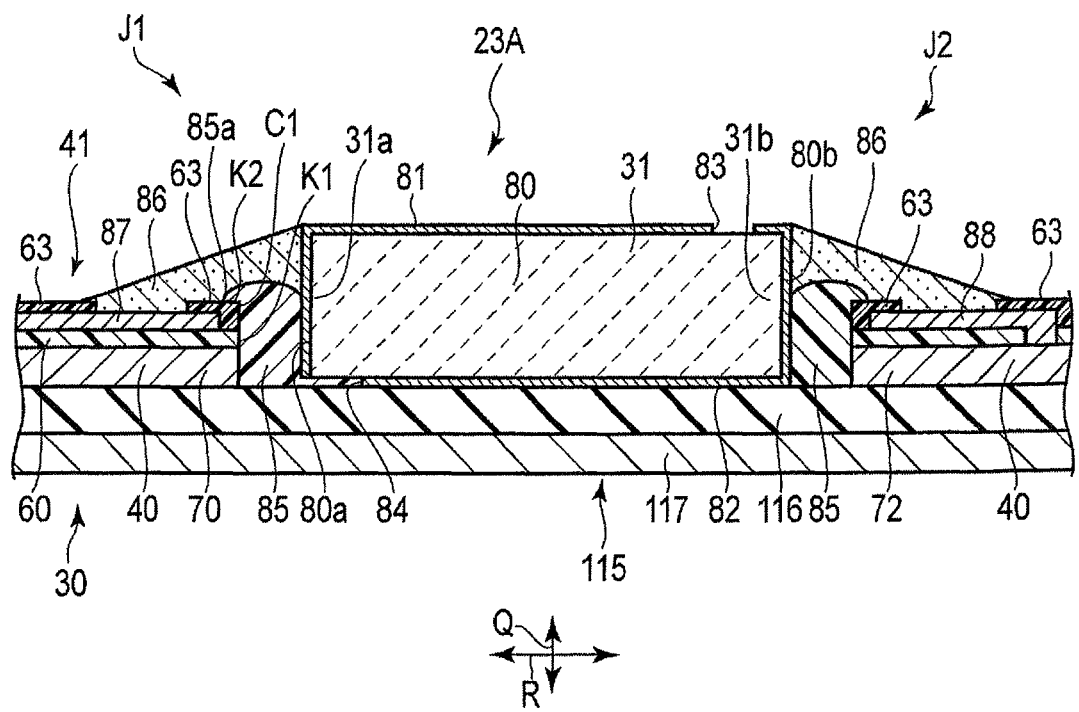
F I G. 17
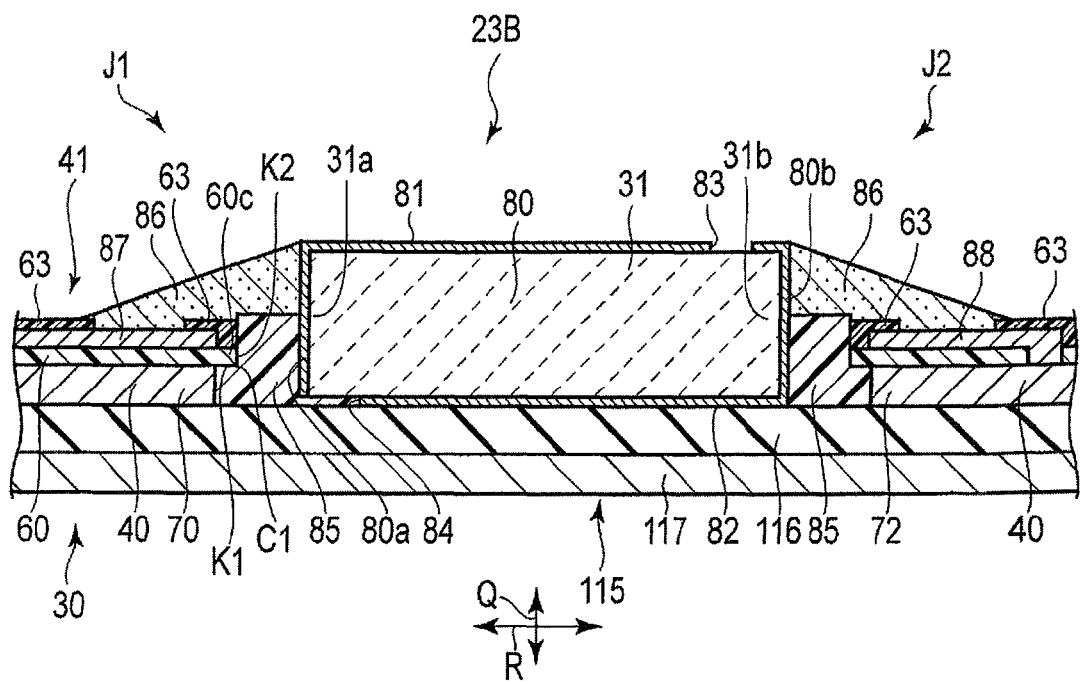
F I G. 18

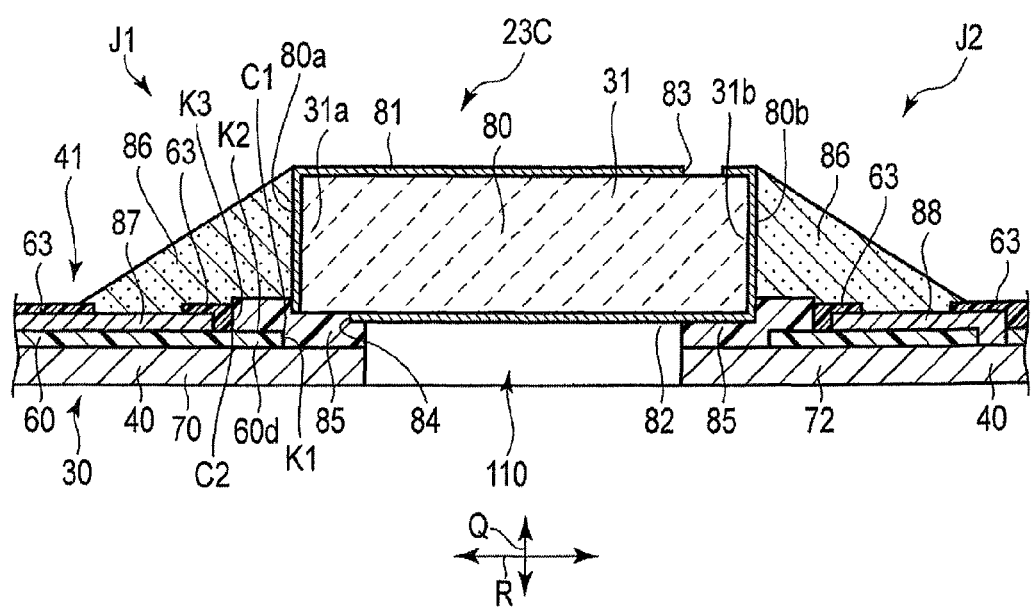
F I G. 19

DISK DRIVE SUSPENSION WITH INTERFACE INTERSECTION CORNER FORMED BETWEEN INSULATING RESIN LAYER AND ADHESIVE BLOCK

CROSS-REFERENCE TO RELATED APPLICATIONS

This application is based upon and claims the benefit of priority from prior Japanese Patent Application No. 2012-214023, filed Sep. 27, 2012, the entire contents of which are incorporated herein by reference.

BACKGROUND OF THE INVENTION

1. Field of the Invention

This invention relates to a disk drive suspension comprising a microactuator element of, for example, lead zirconate titanate (PZT).

2. Description of the Related Art

A hard disk drive (HDD) is used in an information processing apparatus, such as a personal computer. The HDD comprises a magnetic disk rotatable about a spindle, a carriage turnable about a pivot, etc. The carriage, which comprises an actuator arm, is configured to be turned transversely relative to tracks about the pivot by a positioning motor, such as a voice coil motor.

A suspension is mounted on the actuator arm. The suspension comprises a load beam, flexure superposed thereon, etc. A slider, which constitutes a magnetic head, is mounted on a gimbal portion formed near the distal end of the flexure. The slider is provided with elements (transducers) for accessing data, that is, for reading or writing data. The load beam, flexure, slider, etc., constitute a head gimbal assembly.

In order to overcome the increase in the recording density of disks, the magnetic head should be more precisely positioned relative to the recording surface of each disk. To attain this, dual-stage-actuator (DSA) suspensions have been developed that combine a positioning motor (voice coil motor) and microactuator element made of a piezoelectric material, such as lead zirconate titanate (PZT).

The distal end of the suspension can be quickly moved by an infinitesimal distance in a sway direction (or transversely relative to tracks) by applying a voltage to and thereby deforming the microactuator element. As disclosed in Jpn. Pat. Appln. KOKAI Publications Nos. 2007-234982 (Patent Document 1) and 2008-287835 (Patent Document 2), moreover, there are also known co-located DSA suspensions in which a slider and microactuator element are mounted on a gimbal portion of the suspension. In the suspensions described in Patent Documents 1 and 2, measures are taken to suppress migration between conducting members in a circuit part of a flexure.

In order to electrically connect an electrode of the microactuator element and a conductor of a conductive circuit portion, an electrically conductive paste, such as a silver paste, may be provided between the electrode and conductor. The silver paste comprises, for example, a thermosetting binder and silver particles mixed therein and can be cured by heating. In DSA suspensions that have recently been downsized more and more, especially in those ones with a microactuator element and slider mounted on a gimbal portion, it is also important to ensure electrical insulation between the conductor and silver paste on the gimbal portion with a small area.

Even if a certain distance for electrical insulation is maintained between the silver paste and conductor, silver ions in the silver paste may sometimes move along adhesive interfaces of, for example, an electrically insulating adhesive due to a potential difference. The movement of the silver ions causes electrochemical migration (ion migration), that is, growth of a causative agent for an electrical short, such as dendrite, along the adhesive interfaces. According to conventional migration preventive measures, migration between conducting members is suppressed. In the conventional case, however, no consideration is given to ion migration that occurs between a conductor and electrically conductive paste on a microactuator mounting section, and the growth of the causative agent for short-circuiting along the adhesive interfaces is out of account.

BRIEF SUMMARY OF THE INVENTION

Accordingly, the object of this invention is to provide a disk drive suspension or co-located DSA suspension with a slider and microactuator element mounted on a gimbal portion, capable of suppressing growth of a causative agent for an electrical short due to ion migration.

A disk drive suspension according to an embodiment comprises a load beam, a flexure comprising a stationary part secured to the load beam and a gimbal portion on which a slider is disposed, and a microactuator element mounted on the gimbal portion. The microactuator element comprises an element body, which comprises first and second end surfaces, and an electrode covering at least one of the end surfaces of the element body. The gimbal portion comprises a metal base, an electrically insulating resin layer provided on the metal base, a conductor disposed overlapping the resin layer in the thickness direction thereof, an electrically insulating adhesive block which secures an end portion of the microactuator element to the metal base, an electrically conductive paste provided between the conductor and the electrode of the microactuator element, a first adhesive interface at which the resin layer and the electrically insulating adhesive block adhere to each other in the thickness direction of the resin layer, between the metal base and the electrically conductive paste, a second adhesive interface at which the resin layer and the electrically insulating adhesive block adhere to each other along a surface of the resin layer, between the metal base and the electrically conductive paste, and a corner portion formed at a part where the first adhesive interface and the second adhesive interface intersect each other.

According to the arrangement of this embodiment, a co-located DSA suspension with the slider and microactuator element mounted on the gimbal portion is configured so that growth of a causative agent for an electrical short along adhesive interfaces between the electrically conductive paste on the electrode of the microactuator element and the conductor of a conductive circuit portion can be suppressed, and therefore, short-circuiting between the conductive paste and conductor can be prevented.

The disk drive suspension of the embodiment comprises an opening formed in the metal base of the gimbal portion, the microactuator element accommodated in the opening, and a damper member which is secured to the metal base so as to cover at least a part of the opening and supports the microactuator element. The damper member may comprise a viscoelastic material layer and a constrained plate laminated to the viscoelastic material layer, the viscoelastic material layer being disposed facing the opening with the microactuator element bonded to the viscoelastic material layer.

The disk drive suspension may further comprise a third adhesive interface at which the resin layer and the electrically insulating adhesive block adhere to each other in the thickness direction of the resin layer, between the metal base and the electrically conductive paste. A part of the electrically insulating adhesive block may be formed with an overlapping portion overlapping the resin layer, and the second adhesive interface may be formed inside the overlapping portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a plan view of the microactuator mounting section of FIG. 5;

FIG. 8 is a partial sectional view of a conductive circuit portion of a flexure of the suspension;

FIG. 9 is a sectional view of the microactuator mounting section of FIG. 4;

FIG. 10 is a partial sectional view showing a load beam and gimbal portion;

FIG. 11 is a partial plan view of the flexure of the microactuator mounting section of FIG. 5;

FIG. 14 is a perspective view showing how a microactuator element is disposed on the gimbal portion of FIG. 12;

FIG. 15 is a perspective view showing how electrically conductive pastes are provided on the microactuator element of FIG. 12;

FIG. 17 is a sectional view of a microactuator mounting section according to a second embodiment;

FIG. 18 is a sectional view of a microactuator mounting section according to a third embodiment; and FIG. 19 is a sectional view of a microactuator mounting section according to a fourth embodiment.

DETAILED DESCRIPTION OF THE INVENTION

A disk drive suspension according to a first embodiment will now be described with reference to FIGS. 1 to 16.

Figure 1:
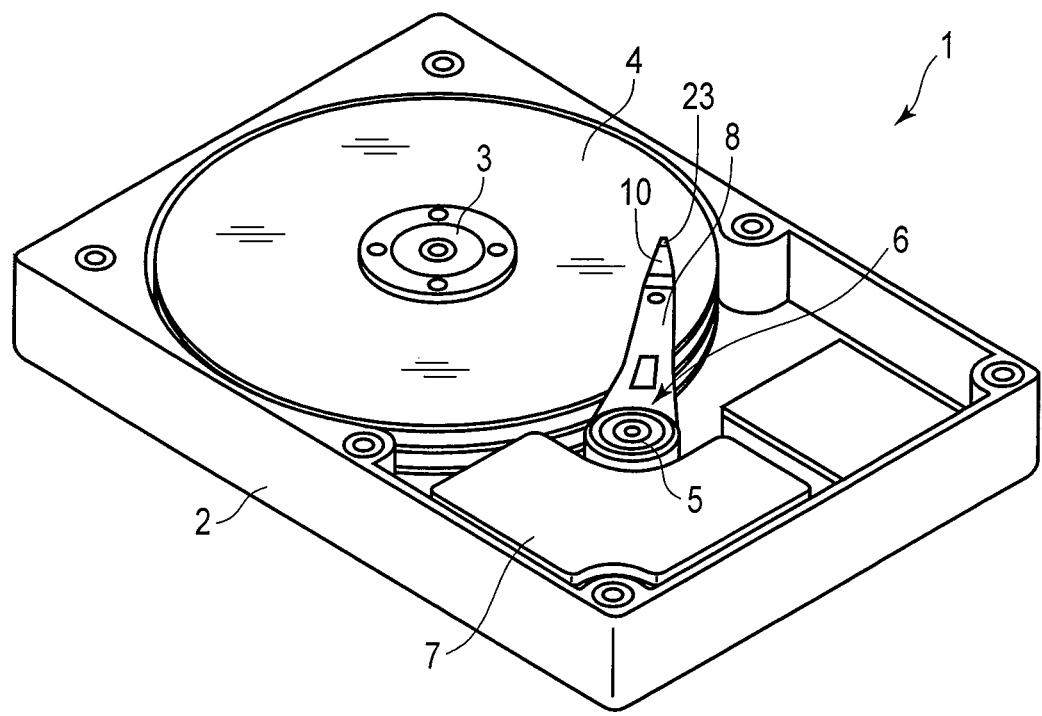
FIG. 1 is a perspective view showing an example of a disk drive.

A disk drive (HDD) 1 shown in FIG. 1 comprises a case 2, disks 4 rotatable about a spindle 3, carriage 6 turnable about a pivot 5, positioning motor (voice coil motor) 7 for actuating the carriage 6, etc. The case 2 is sealed by a lid (not shown).

Figure 2:
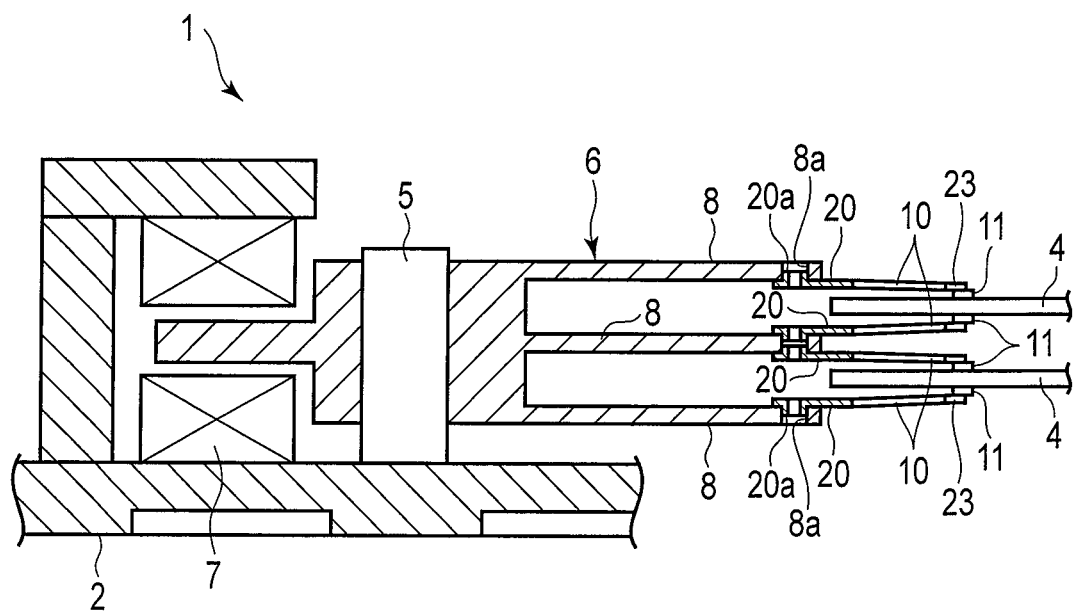
FIG. 2 is a partial sectional view of the disk drive shown in FIG. 1.

FIG. 2 is a sectional view schematically showing a part of the disk drive 1. As shown in FIGS. 1 and 2, the carriage 6 comprises arms (carriage arms) 8. A suspension 10 is mounted on the distal end portion of each arm 8. A slider 11, which constitutes a magnetic head, is provided on the distal end portion of the suspension 10. In a state where each disk 4 rotates at high speed, an air bearing is formed between the disk and the slider 11 as air flows in between the disk and slider.

If the carriage 6 is turned by the positioning motor 7, the suspension 10 moves radially relative to the disk 4. Thereupon, the slider 11 moves to a desired track of the disk 4.

Figure 3:
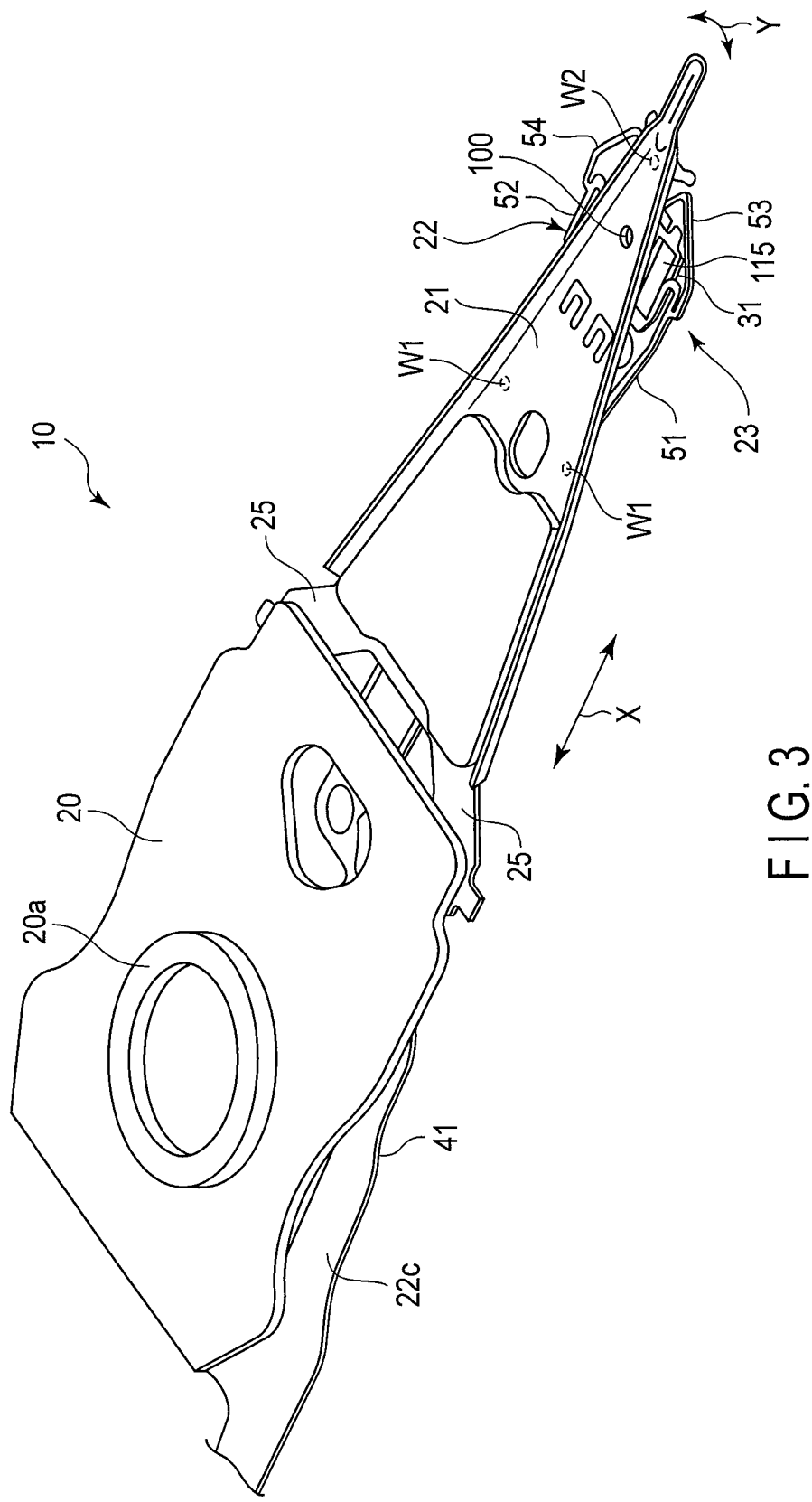
FIG. 3 is a perspective view of a suspension according to a first embodiment.

FIG. 3 shows the suspension 10 of the dual-stage-actuator (DSA) type. This suspension 10 comprises a baseplate 20 secured to its corresponding arm 8 (FIGS. 1 and 2) of the carriage 6, load beam 21, flexure 22 with conductors, microactuator mounting section 23 located near the distal end of the suspension 10, etc. A boss portion 20a to be inserted into a hole 8a (FIG. 2) in each arm 8 is formed on the baseplate 20.

In FIG. 3, arrows X and Y indicate the longitudinal direction of the load beam 21, that is, the longitudinal direction (front-rear direction) of the suspension 10, and a sway direction (transverse direction of the slider 11), respectively. Spring portions 25 capable of thicknesswise springy deformation are formed on the proximal portion (rear end portion) of the load beam 21. The flexure 22 is disposed along the load beam 21.

Figure 4:
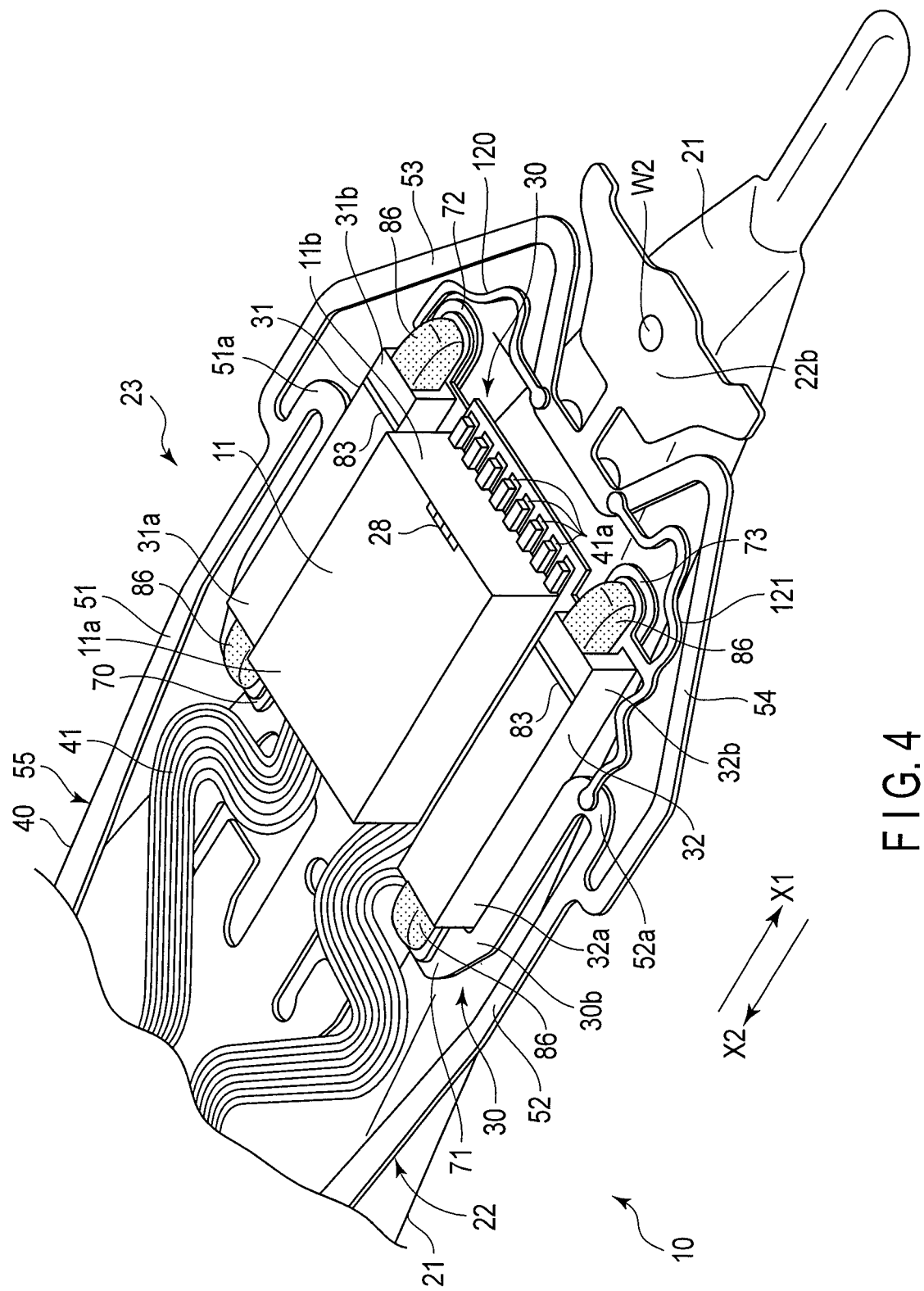
FIG. 4 is a perspective view of a microactuator mounting section of the suspension of FIG. 3 taken from the slider.

FIG. 4 is a perspective view of the microactuator mounting section 23 taken from the side of the slider 11. The microactuator mounting section 23 is disposed on the distal end portion of the suspension 10. Elements 28, such as magnetoresistive (MR) elements capable of conversion between magnetic and electrical signals, are disposed on an end portion of the slider 11 that constitutes the magnetic head. These elements 28 serve to access data, that is, write or read data to or from the disk 4. The slider 11, load beam 21, flexure 22, etc., constitute a head gimbal assembly.

The microactuator mounting section 23 comprises a gimbal portion 30 formed on the distal end portion of the flexure 22 and a pair of microactuator elements 31 and 32. These microactuator elements 31 and 32 are disposed individually on the opposite sides of the slider 11 on the gimbal portion 30. The microactuator elements 31 and 32 are formed of piezoelectric plates of PZT or the like and have the function of pivoting the slider 11 in the sway direction by means of a structure described in detail later.

Figure 5:
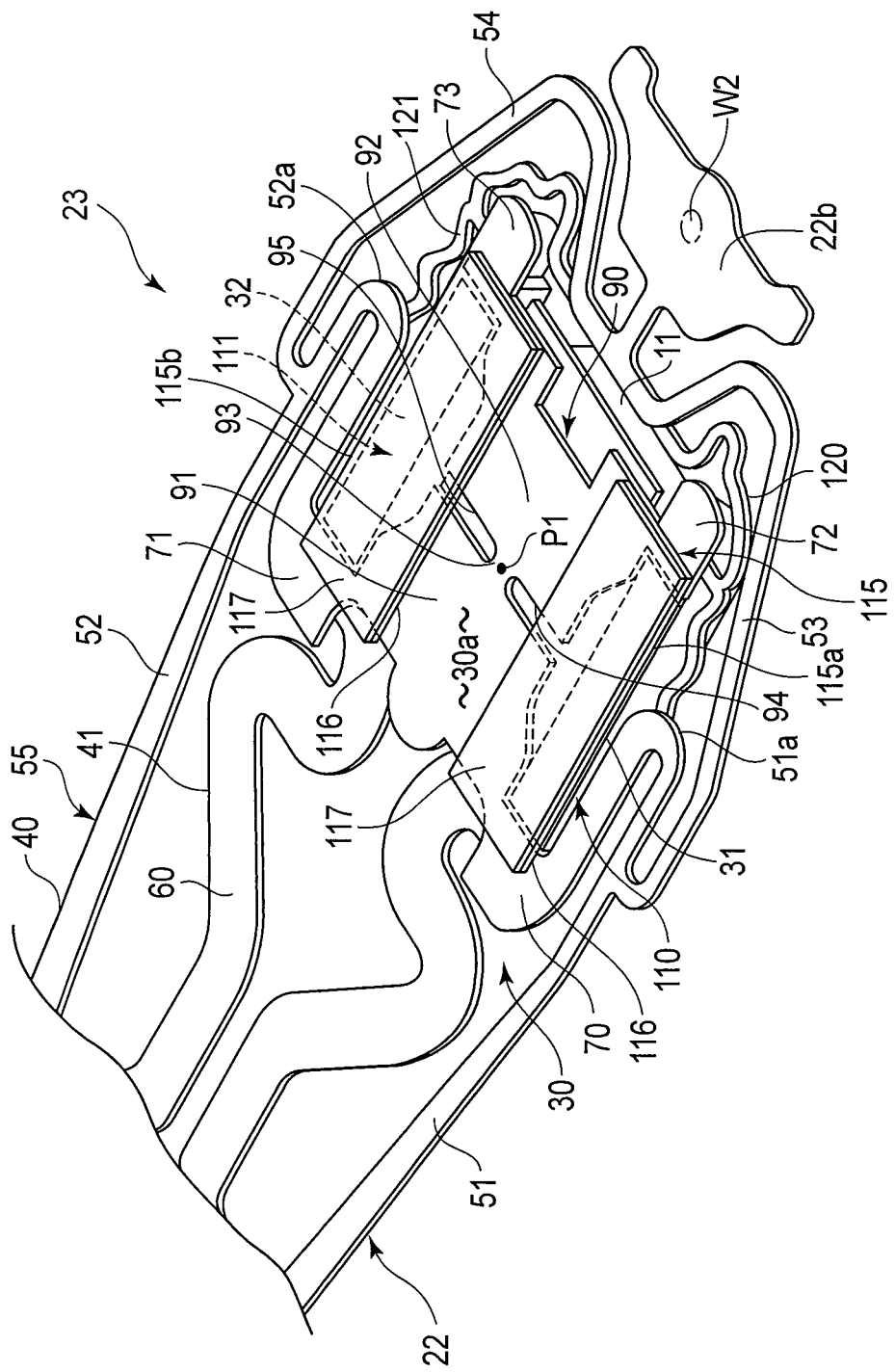
FIG. 5 is a perspective view of the microactuator mounting section of FIG. 4 taken from the side opposite to FIG. 4.
Figure 7:
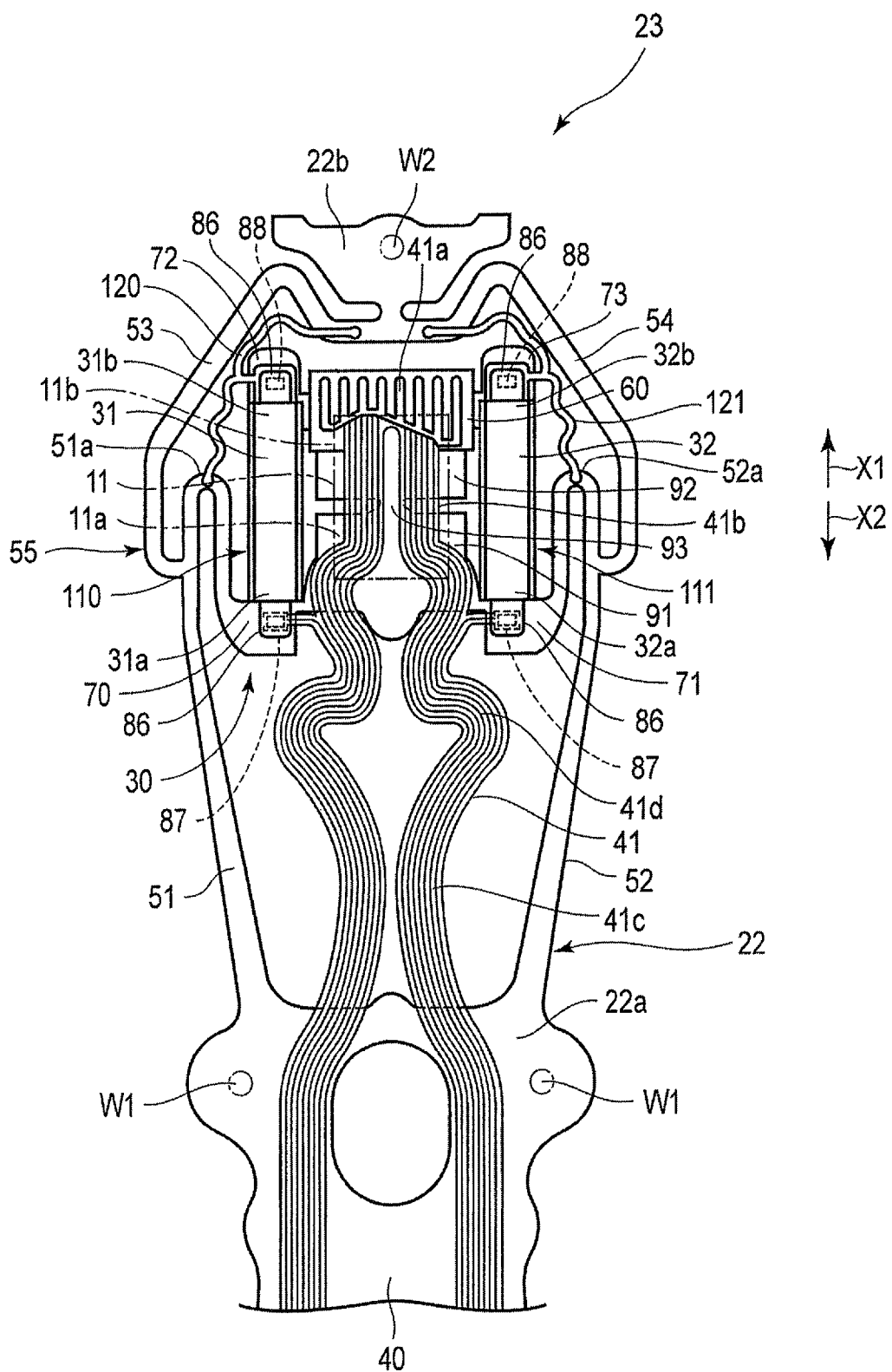
FIG. 7 is a bottom view of the microactuator mounting section of FIG. 5 taken from the side opposite to FIG. 6.

FIG. 5 is a perspective view of the gimbal portion 30 on the distal end portion of the flexure 22 and the microactuator elements 31 and 32 taken from the side opposite to FIG. 4. FIG. 6 is a plan view showing the gimbal portion 30, microactuator elements 31 and 32, etc. FIG. 7 is a bottom view of the microactuator mounting section 23 taken from the side opposite to FIG. 6.

The flexure 22 comprises a metal base 40, formed of a stainless-steel plate, and a conductive circuit portion 41. The conductive circuit portion 41 is disposed along the metal base 40. The conductive circuit portion 41 comprises a part overlapping the metal base 40 and a part not overlapping the metal base 40.

The metal base 40 is secured to the load beam 21 by fixing means, such as first welds W1 (FIGS. 3, 6, etc.) and a second weld W2 (FIGS. 3 to 7) formed by, for example, laser welding. Specifically, the flexure 22 comprises first and second stationary parts 22a and 22b. The first stationary part 22a is secured to the load beam 21 by the welds W1 at a front-rear intermediate portion of the suspension 10. The second stationary part 22b is secured to the load beam 21 by the weld W2 in a position near the distal end of the flexure 22. A rear portion 22c (FIG. 3) of the flexure 22 extends rearward from the baseplate 20.

As shown in FIGS. 5 to 7, etc., the metal base 40 of the flexure 22 comprises a pair of first arms 51 and 52 and a pair of second arms 53 and 54. The first arms 51 and 52 connect with the first stationary part 22a, and the second arms 53 and 54 with the second stationary part 22b. Respective distal end portions 51a and 52a of the first arms 51 and 52 are U-shaped. The respective rear ends of the second arms 53 and 54 are connected to the vicinity of the distal end portions 51a and 52a. The first arms 51 and 52 and second arms 53 and 54 constitute an arm portion 55 for elastically supporting the gimbal portion 30.

FIG. 8 shows an example of cross-sections of the metal base 40 and conductive circuit portion 41. The conductive circuit portion 41 comprises an electrically insulating resin layer 60, write conductors 61, read conductors 62, cover layer 63, etc. The resin layer 60 and cover layer 63 are made of an electrically insulating resin, such as polyimide. The conductors 61 and 62 are formed on the resin layer 60. The write and read conductors 61 and 62 are disposed overlapping each other in the thickness direction on the resin layer 60. These conductors 61 and 62 are electrically connected to the elements 28 of the slider 11 (FIG. 4). By way of example, the thickness of the metal base 40 is 20 μm (12 to 25 μm); that of the resin layer 60, 10 μm (5 to 20 μm); that of each of the conductors 61 and 62, 9 μm (4 to 15 μm); and that of the cover layer 63, 5 μm (2 to 10 μm). The thickness of the metal base 40 is smaller than that (e.g., 30 μm) of the load beam 21.

The pair of microactuator elements 31 and 32 are disposed on the gimbal portion 30 of the flexure 22. The gimbal portion 30 of this embodiment comprises a first surface 30a (FIGS. 5 and 10) facing the load beam 21 and a second surface 30b (FIGS. 4 and 10) opposite to the first surface 30a. A damper member 115 (described later) is disposed on the first surface 30a. The slider 11 and microactuator elements 31 and 32 are disposed on the second surface 30b.

The microactuator elements 31 and 32 comprise first end portions 31a and 32a and second end portions 31b and 32b, respectively. Arrows X1 and X2 in FIGS. 4, 6 and 7 indicate forward and rearward directions, respectively, with respect to the microactuator elements 31 and 32. The first end portions 31a and 32a of the microactuator elements 31 and 32 are secured to a pair of first supporting portions 70 and 71, respectively, formed on the gimbal portion 30. The first supporting portions 70 and 71 connect with the first stationary part 22a of the flexure 22 through the flexible first arms 51 and 52, respectively. The distal end portions 51a and 52a of the first arms 51 and 52 connect with the second stationary part 22b of the flexure 22 through the second arms 53 and 54, respectively. Thus, the first supporting portions 70 and 71 of the gimbal portion 30 are supported on the stationary parts 22a and 22b by the arm portion 55 (comprising the first arms 51 and 52 and second arms 53 and 54) that can be elastically deformed relative to the load beam 21. The second end portions 31b and 32b of the microactuator elements 31 and 32 are secured to second supporting portions 72 and 73, respectively, of the gimbal portion 30.

FIG. 9 shows cross-sections of joint portions J1 and J2 that mechanically secure and electrically connect the end portions 31a and 31b of the one microactuator element 31. Since joint portions of the other microactuator element 32 are constructed in the same manner as those shown in FIG. 9, the one microactuator element 31 will be representatively described below.

As shown in FIG. 9, the microactuator element 31 comprises an element body 80 of lead zirconate titanate (PZT) and first and second electrodes 81 and 82 formed on the peripheral surface of the element body 80. The first electrode 81 is formed ranging from a first end surface 80a of the element body 80 to the upper surface thereof. Thus, the first electrode 81 covers at least the first end surface 80a. The second electrode 82 is formed ranging from a second end surface 80b of the element body 80 to the lower surface thereof. Thus, the second electrode 82 covers at least the second end surface 80b. Slits 83 and 84 for electrical insulation are formed between the first and second electrodes 81 and 82.

In the first joint portion J1, the first end portion 31a of the microactuator element 31 is secured to the metal base 40 at the first supporting portion 70 by an electrically insulating adhesive block 85. The second end portion 31b of the microactuator element 31 is secured to the metal base 40 at the second supporting portion 72 by an electrically insulating adhesive block 85.

An electrically conductive paste (e.g., silver paste) 86 is provided between a conductor 87 and the first electrode 81 of the microactuator element 31 shown in FIG. 9. The first electrode 81 conducts to the conductor 87 of the conductive circuit portion 41 through the conductive paste 86 on the first supporting portion 70. The conductor 87 is a signal-side conductor. The conductive paste 86 comprises, for example, a thermosetting binder and silver particles mixed therein and can be cured by heating.

The first joint portion J1 comprises first to third adhesive interfaces K1 to K3 and corner portion C1. The other joint portion J2 is constructed in the same manner. The first adhesive interface K1 is formed in such a manner that the resin layer 60 and electrically insulating adhesive block 85 adhere to each other in the thickness direction (indicated by arrow Q in FIG. 9) of the resin layer 60, between the metal base 40 and conductive paste 86. The second adhesive interface K2 is formed in such a manner that the resin layer 60 and electrically insulating adhesive block 85 adhere to each other along a surface of the resin layer 60 (that is, surface direction indicated by arrow R in FIG. 9), between the metal base 40 and conductive paste 86. The corner portion C1 is a part where the first and second adhesive interfaces K1 and K2 intersect at right angles.

In the embodiment shown in FIG. 9, an overlapping portion 85a that overlaps the resin layer 60 is formed on a part of the electrically insulating adhesive block 85. The second adhesive interface K2 is formed inside the overlapping portion 85a. The third adhesive interface K3 is formed in such a manner that the cover layer 63 and electrically insulating adhesive block 85 adhere to each other in the thickness direction (indicated by arrow Q in FIG. 9) of the resin layer 60, between the metal base 40 and conductive paste 86.

According to the first joint portion J1 constructed in this manner, directions of the first and second adhesive interfaces K1 and K2 are different from each other by approximately 90° about the corner portion C1, between the metal base 40 and conductive paste 86. Further, the third adhesive interface K3 extends perpendicular to the second adhesive interface K2. When a potential is applied between the metal base 40 and conductive paste 86, therefore, growth of a causative agent for an electrical short, such as dendrite, along the adhesive interfaces of the electrically insulating adhesive block 85 can be suppressed. Thus, short-circuiting between the metal base 40 and conductive paste 86 can be prevented.

In the second joint portion J2 shown on the right-hand side of FIG. 9, an electrically conductive paste (e.g., silver paste) 86 is provided between a ground-side conductor 88 and the second electrode 82 of the microactuator element 31. The second electrode 82 conducts to the ground-side conductor 88 through the conductive paste 86 on the second supporting portion 72. The ground-side conductor 88 is secured to and conducts to the metal base 40.

As shown in FIGS. 5, 6, etc., the gimbal portion 30 of the flexure 22 comprises a tongue 90. The tongue 90 comprises a first tongue portion 91 on the stationary side, second tongue portion 92 on the movable side, and hinge portion 93 formed between the tongue portions 91 and 92. The first tongue portion 91 is formed between the pair of first supporting portions 70 and 71, and the second tongue portion 92 between the pair of second supporting portions 72 and 73. The hinge portion 93 is formed between the first and second tongue portions 91 and 92. The supporting portions 70 to 73, tongue portions 91 and 92, and hinge portion 93 all constitute a part of the metal base 40, and their respective contours are formed by, for example, etching. The first and second tongue portions 91 and 92 and hinge portion 93 constitute the tongue 90 configured to carry the slider 11 thereon.

As shown in FIG. 7, the conductive circuit portion 41 branches left and right and extends above the first and second tongue portions 91 and 92. Terminals 41a for the slider 11 are formed on the distal end of the conductive circuit portion 41. These terminals 41a conduct to the conductors 61 and 62 of the conductive circuit portion 41. Further, the terminals 41a are electrically connected to the elements 28 of the slider 11 (FIG. 4). The conductors 87 for the microactuator elements 31 and 32 are provided individually on the left- and right-hand sides of the conductive circuit portion 41. The conductors 87 are connected to the respective electrodes 81 of the microactuator elements 31 and 32 on the first supporting portions 70 and 71, individually.

The conductive circuit portion 41 comprises a first wiring pattern portion 41b disposed between the microactuator elements 31 and 32 and a second wiring pattern portion 41c extending rearward relative to the gimbal portion 30 from the first wiring pattern portion 41b. A curved portion 41d is formed at a longitudinal part of the second wiring pattern portion 41c, whereby the rigidity of that part of the conductive circuit portion 41 between the first arms 51 and 52 is reduced.

FIG. 10 is a partial sectional view of the load beam 21 and gimbal portion 30 taken at the location of the hinge portion 93. FIG. 11 is a plan view of the gimbal portion 30, a part of the flexure 22. Width L1 of the hinge portion 93 is sufficiently smaller than width L2 of each of the first and second tongue portions 91 and 92. Slits 94 and 95 are formed between the tongue portions 91 and 92 on the opposite sides of the hinge portion 93, individually. The tongue portions 91 and 92 are relatively pivotably connected together by the narrow hinge portion 93. Thus, the second tongue portion 92 on the movable side is configured to move relative to the first tongue portion 91 on the stationary side in the directions indicated by arrows A and B in FIG. 11.

The slider 11 is disposed on the first and second tongue portions 91 and 92. Further, a leading-side portion 11a of the slider 11 is disposed for movement relative to the first tongue portion 91. A trailing-side portion 11b of the slider 11 is secured to the second tongue portion 92. The "leading side" stated herein is the side where air flows in between the slider 11 and disk 4 as the disk rotates. On the other hand, the "trailing side" is the side where air between the slider 11 and disk 4 comes out. The hinge portion 93 is formed in the center of the slider 11, e.g., the center of gravity of the slider 11 or the center thereof with respect to both transverse and longitudinal directions.

A convex dimple 100 (FIG. 10) is formed near the distal end of the load beam 21. The dimple 100 is an example of a supporting protrusion and comprises a convex surface projecting toward the first surface 30a of the gimbal portion 30. The top of the convex surface (or the tip of the dimple 100) abuts the hinge portion 93. Specifically, the hinge portion 93 is swingably supported by the tip of the dimple 100. Thus, the gimbal portion 30 is supported for swinging motion relative to the load beam 21 about a point of contact 21 between the hinge portion 93 and the tip of the dimple 100.

Alternatively, a dimple may be formed on the hinge portion 93 such that its tip abuts the load beam 21. In short, the convex dimple should only be formed on one of the respective facing surfaces of the load beam 21 and hinge portion 93 so that its tip abuts the other facing surface.

As shown in FIG. 11, etc., an opening 110 is formed between the first and second supporting portions 70 and 72 on the right-hand side of FIG. 11. The opening 110 communicates with the one slit 94. Likewise, an opening 111 is formed between the first and second supporting portions 71 and 73 on the left-hand side of FIG. 11. The opening 111 communicates with the other slit 95.

The microactuator mounting section 23 of this embodiment comprises the damper member 115. The damper member 115 is attached to the first surface 30a of the metal base 40 of the gimbal portion 30. The damper member 115 of the present embodiment comprises first and second dampers 115a and 115b. The dampers 115a and 115b comprise a viscoelastic material layer 116 and constrained plate 117, respectively.

The viscoelastic material layer 116 is made of a polymeric material (e.g., acrylic resin), which can exhibit a viscous resistance corresponding to its degree of elastic deformation, and has some liquidity and viscosity. The constrained plate 117 is made of a synthetic resin, such as polyimide, and is laminated in the thickness direction of the viscoelastic material layer 116. Thickness T (FIG. 10) of the damper member 115 is smaller than projection height H (e.g., 40 to 90 μm) of the dimple 100. If projection height H of the dimple 100 is, for example, 75 μm, thickness T of the damper member 115 is 50 μm. The thicknesses of the viscoelastic material layer 116 and constrained plate 117 are, for example, 25 μm each.

The first damper 115a is disposed spanning between the first and second tongue portions 91 and 92 and longitudinally relative to the microactuator element 31, one of the pair of microactuator elements 31 and 32. The second damper 115b is disposed spanning between the first and second tongue portions 91 and 92 and longitudinally relative to the other microactuator element 32.

Figure 12:
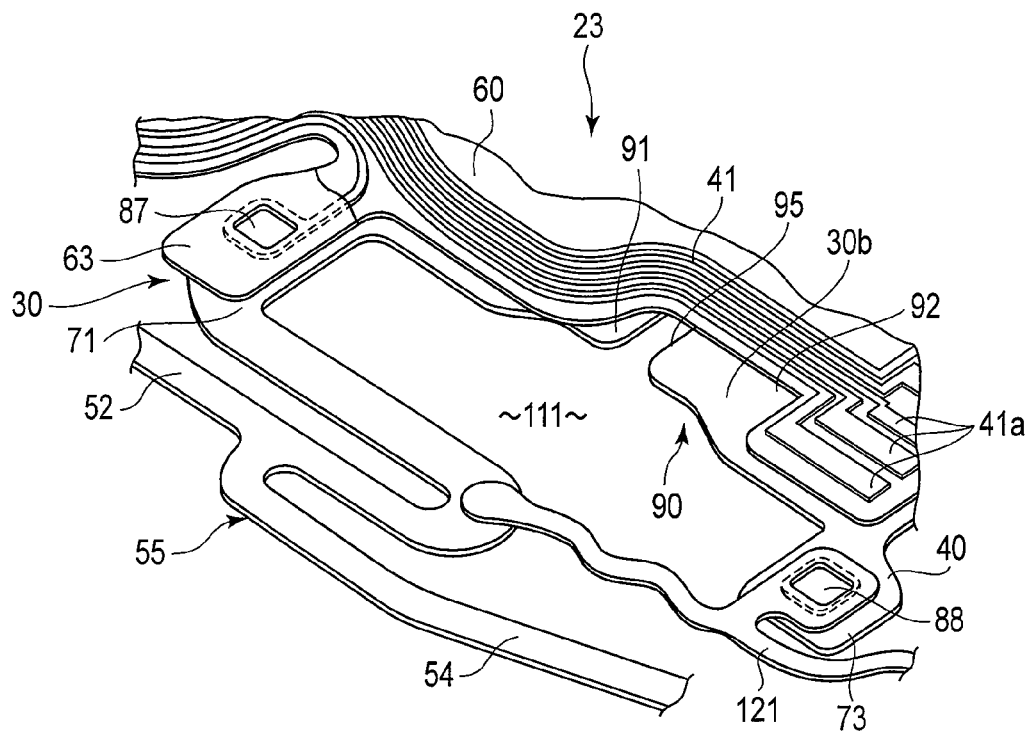
FIG. 12 is a partial perspective view of the gimbal portion of the microactuator mounting section of FIG. 5.
Figure 13:
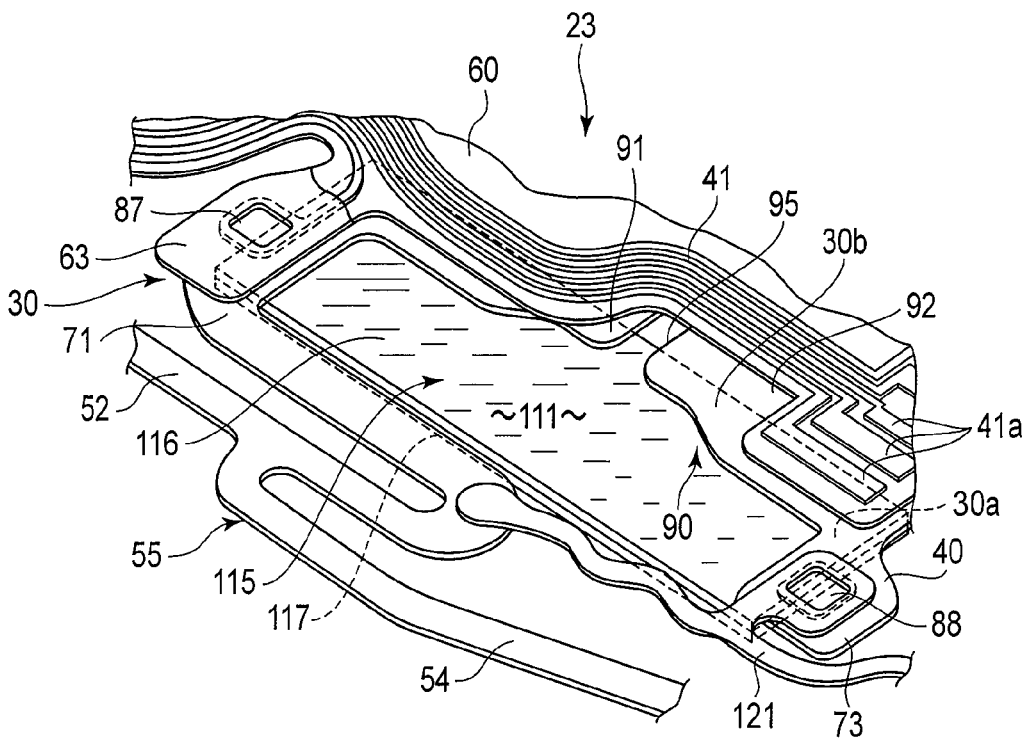
FIG. 13 is a perspective view showing how a damper member is provided on the gimbal portion of FIG. 12.

As shown in FIG. 12, the opening 111 is formed between the first and second supporting portions 71 and 73. The opening 111 is sufficiently large to accommodate the microactuator element 32. As shown in FIG. 13, the viscoelastic material layer 116 of the damper member 115 faces the opening 111. The damper member 115 is secured to the first surface 30a of the gimbal portion 30 from below the opening 111. At least a part of the opening 111 is covered by the damper member 115.

As shown in FIG. 14, the microactuator element 32 is fitted into the opening 111 and placed on the viscoelastic material layer 116. This microactuator element 32 is secured to the damper member 115 by the adhesive force of the viscoelastic material layer 116. The opposite end portions 32a and 32b of the microactuator element 32 are secured to the metal base 40 at the first and second supporting portions 71 and 73, respectively, by the electrically insulating adhesive blocks 85.

As shown in FIG. 15, the electrically conductive paste (e.g., silver paste) 86 is provided between the conductor 87 and the first end portion 32a of the microactuator element 32. Also, the conductive paste 86 is provided between the ground-side conductor 88 and the second end portion 32b of the microactuator element 32. These conductive pastes 86 are heated and cured by a subsequent heating process.

The microactuator mounting section 23 of the present embodiment comprises limiter members 120 and 121. As shown in FIGS. 4 and 7, the one limiter member 120 is connected to the distal end portion 51a of the first arm 51, second arm 53, and second supporting portion 72. The other limiter member 121 is connected to the distal end portion 52a of the first arm 52, second arm 54, and second supporting portion 73.

The limiter members 120 and 121 have the function of keeping the tongue portions 91 and 92 from excessively shaking or the hinge portion 93 from moving away from the dimple 100 (dimple separation) if the suspension 10 is subjected to external mechanical shock. The limiter members 120 and 121 are made of an electrically insulating resin, such as polyimide, shared with the resin layer 60 (FIGS. 8 and 9) of the conductive circuit portion 41, and are crimped so that they do not interfere with the motion of the microactuator elements 31 and 32 in operation.

The following is a description of the operation of the suspension 10 of the present embodiment.

If the carriage 6 (FIGS. 1 and 2) is turned by the positioning motor 7, the suspension 10 moves radially relative to the disk 4. Thereupon, the slider 11 of the magnetic head moves to a desired track of the recording surface of the disk 4. If a voltage is applied to the microactuator elements 31 and 32, the microactuator elements 31 and 32 are oppositely distorted relative to each other. In this way, the load beam 21 can be moved by an infinitesimal distance in the sway direction (indicated by arrow Y in FIG. 3).

Figure 16:
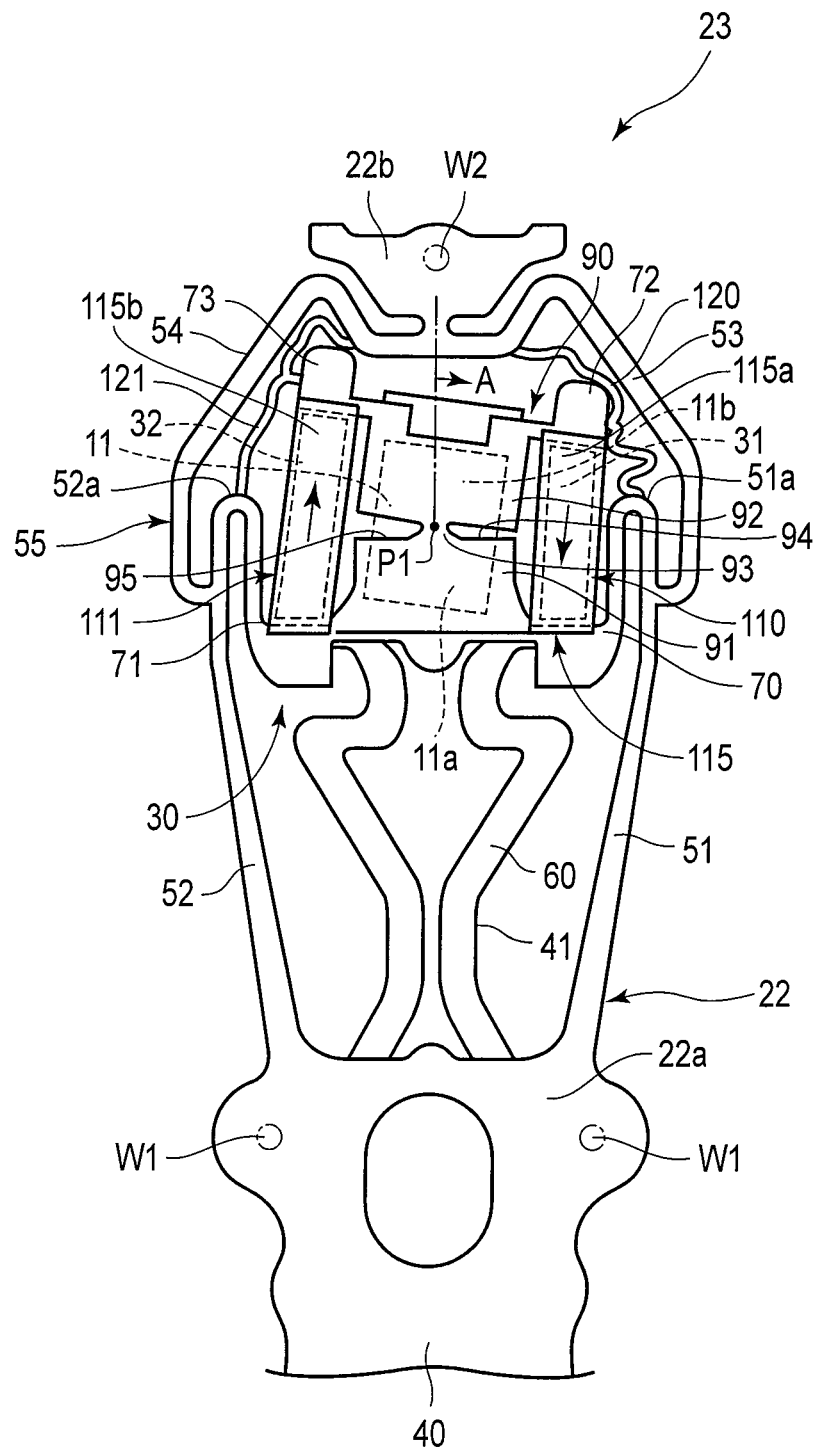
FIG. 16 is a plan view schematically showing the microactuator mounting section with the microactuator element actuated.

As schematically shown in FIG. 16, for example, the second tongue portion 92 moves in the direction of arrow A as the one and the other microactuator elements 31 and 32 contract and extend, respectively. Thus, the elements 28 (FIG. 4) on the slider 11 can be quickly precisely positioned in the sway direction. Actually, the movement distance of the slider 11 in the sway direction ranges from several nm to several tens of nm. In FIG. 16, however, the degree of deformation of the gimbal portion 30 is exaggeratedly indicated for better understanding of the movements of the slider 11 and second tongue portion 92.

In the microactuator mounting section 23 of the present embodiment, the second tongue portion 92 on the movable side pivots transversely relative to the slider 11 about the hinge portion 93, with respect to the first tongue portion 91 on the stationary side, if the microactuator elements 31 and 32 are actuated. The trailing-side portion 11b of the slider 11 is secured to the second tongue portion 92. In contrast, the leading-side portion 11a of the slider 11 is movable relative to the first tongue portion 91. As shown in FIG. 10, the tip of the dimple 100 abuts the hinge portion 93 at the point of contact P1.

If the microactuator elements 31 and 32 are actuated by application of a voltage, therefore, the second tongue portion 92 and slider 11 pivot about the point of contact P1 with the dimple 100. Thus, the pivot center of the slider 11 can be matched with the position of the contact point P1 of the dimple 100. In this way, the tip of the dimple 100 can be kept from rubbing against the flexure 22 when the microactuator elements 31 and 32 are actuated (or when the slider 11 is pivoted). Thus, production of high frictional resistance or a causative agent of contamination during the pivoting motion of the second tongue portion 92 can be suppressed.

In addition, the microactuator elements 31 and 32 are disposed on the second surface 30b of the gimbal portion 30 on the same side as the slider 11. Therefore, the thickness of each of the microactuator elements 31 and 32 need not be made smaller than the projection height of the dimple 100. Accordingly, thick structures can be used for the microactuator elements 31 and 32. Thus, the available microactuator elements 31 and 32 provide high output load and mechanical strength and are hard to break.

The microactuator mounting section 23 of the present embodiment comprises the damper member 115 on the gimbal portion 30, and the viscoelastic material layer 116 of the damper member 115 adheres to the microactuator elements 31 and 32 and metal base 40. Since the viscoelastic material layer 116 has some liquidity and viscosity, it is displaced together with the metal base 40 and constrained plate 117 that vibrate when energy to cause the gimbal portion 30 to vibrate is input. If the viscoelastic material layer 116 is deformed, internal resistance is produced by friction between molecules that constitute the viscoelastic material layer 116, and vibrational energy of the constrained plate 117 and the like is converted into thermal energy. In this way, the viscoelastic material layer 116 can suppress the vibration of the gimbal portion 30 and reduce resonance gain.

FIG. 17 shows a microactuator mounting section 23A according to a second embodiment. In this embodiment, an overlapping portion 85a that overlaps a cover layer 63 is formed on a part of an electrically insulating adhesive block 85. A second adhesive interface K2 is formed inside the overlapping portion 85a. Since other configurations and effects are common to the microactuator mounting sections 23 and 23A of the first and second embodiments, common numbers are used to designate common portions of the first and second embodiments, and a description of those portions is omitted.

FIG. 18 shows a microactuator mounting section 23B according to a third embodiment. In this embodiment, an overhanging portion 60c that projects from an end of a metal base 40 is provided on an edge portion of a resin layer 60. First and second adhesive interfaces K1 and K2 and corner portion C1 are formed on the overhanging portion 60c. Since other configurations and effects are common to the microactuator mounting sections 23 and 23B of the first and third embodiments, common numbers are used to designate common portions of the first and third embodiments, and a description of those portions is omitted.

FIG. 19 shows a microactuator mounting section 23C according to a fourth embodiment. In this embodiment, an extending portion 60d is formed on an edge of a resin layer 60. First and second adhesive interfaces K1 and K2 and first corner portion C1 are formed on the extending portion 60d. A third adhesive interface K3 is formed on the extending portion 60d. The third adhesive interface K3 extends perpendicular to the second adhesive interface K2. A second corner portion C2 is formed between the second and third adhesive interfaces K2 and K3. Since other configurations and effects are common to the microactuator mounting sections 23 and 23C of the first and fourth embodiments, common numbers are used to designate common portions of the first and fourth embodiments, and a description of those portions is omitted.

It is to be understood, in carrying out the present invention, that the specific forms of the constituent elements of the microactuator mounting section, including the shapes, layouts, etc., of the damper member and microactuator elements, may be modified variously. Although the damper member is effective for suppressing shaking of the gimbal portion, it need not necessarily be provided, depending on the specifications of the gimbal portion.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension comprising:
   a load beam;
   a flexure comprising a stationary part secured to the load beam and a gimbal portion on which a slider is disposed; and
   a microactuator element mounted on the gimbal portion,
   wherein the microactuator element comprises an element body, which comprises first and second end surfaces, and an electrode covering at least one of the end surfaces of the element body, and
   wherein the gimbal portion comprises a metal base, an electrically insulating resin layer provided on the metal base, a conductor disposed overlapping the resin layer in a thickness direction thereof, an electrically insulating adhesive block which secures an end portion of the microactuator element to the metal base, an electrically conductive paste provided between the conductor and the electrode of the microactuator element, a first adhesive interface at which the resin layer and the electrically insulating adhesive block adhere to each other in the thickness direction of the resin layer, between the metal base and the electrically conductive paste, a second adhesive interface at which the resin layer and the electrically insulating adhesive block adhere to each other along a surface of the resin layer, between the metal base and the electrically conductive paste, and a corner portion formed at a part where the first adhesive interface and the second adhesive interface intersect each other.

2. The disk drive suspension of claim 1, further comprising:
   an opening formed in the metal base of the gimbal portion, the microactuator element being accommodated in the opening, and
   a damper member which is secured to the metal base so as to cover at least a part of the opening and which supports the microactuator element.

3. The disk drive suspension of claim 2, wherein the damper member comprises a viscoelastic material layer and a constrained plate laminated to the viscoelastic material layer, the viscoelastic material layer being disposed facing the opening with the microactuator element bonded to the viscoelastic material layer.

4. The disk drive suspension of claim 1, further comprising a cover layer which covers the conductor and a third adhesive interface at which the cover layer and the electrically insulating adhesive block adhere to each other in the thickness direction of the resin layer, between the metal base and the electrically conductive paste.

5. The disk drive suspension of claim 2, further comprising a cover layer which covers the conductor and a third adhesive interface at which the cover layer and the electrically insulating adhesive block adhere to each other in the thickness direction of the resin layer, between the metal base and the electrically conductive paste.

6. The disk drive suspension of claim 3, further comprising a cover layer which covers the conductor and a third adhesive interface at which the cover layer and the electrically insulating adhesive block adhere to each other in the thickness direction of the resin layer, between the metal base and the electrically conductive paste.

7. The disk drive suspension of claim 1, wherein a part of the electrically insulating adhesive block is formed with an overlapping portion overlapping the resin layer, and the second adhesive interface is formed inside the overlapping portion.

8. The disk drive suspension of claim 2, wherein a part of the electrically insulating adhesive block is formed with an overlapping portion overlapping the resin layer, and the second adhesive interface is formed inside the overlapping portion.

9. The disk drive suspension of claim 3, wherein a part of the electrically insulating adhesive block is formed with an overlapping portion overlapping the resin layer, and the second adhesive interface is formed inside the overlapping portion.

10. The disk drive suspension of claim 4, wherein a part of the electrically insulating adhesive block is formed with an overlapping portion overlapping the resin layer, and the second adhesive interface is formed inside the overlapping portion.

11. The disk drive suspension of claim 5, wherein a part of the electrically insulating adhesive block is formed with an overlapping portion overlapping the resin layer, and the second adhesive interface is formed inside the overlapping portion.

12. The disk drive suspension of claim 6, wherein a part of the electrically insulating adhesive block is formed with an overlapping portion overlapping the resin layer, and the second adhesive interface is formed inside the overlapping portion.

* * * * *